(12) United States Patent
Gundavelli et al.

(10) Patent No.: US 11,496,888 B2
(45) Date of Patent: Nov. 8, 2022

(54) TECHNIQUES TO PROVIDE SEAMLESS MOBILITY FOR MULTIPLE ACCESSES OF AN ENTERPRISE FABRIC

(71) Applicant: Cisco Technology, Inc., San Jose, CA (US)

(72) Inventors: Srinath Gundavelli, San Jose, CA (US); Indermeet Singh Gandhi, San Jose, CA (US); Sudhir Kumar Jain, Fremont, CA (US); Louis Gwyn Samuel, Swindon (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/718,895

(22) Filed: Dec. 18, 2019

(65) Prior Publication Data
US 2021/0195406 A1    Jun. 24, 2021

(51) Int. Cl.
*H04W 4/00* (2018.01)
*H04W 8/26* (2009.01)
*H04W 36/14* (2009.01)
*H04W 80/04* (2009.01)
*H04L 61/5007* (2022.01)

(52) U.S. Cl.
CPC ........... *H04W 8/26* (2013.01); *H04L 61/5007* (2022.05); *H04W 36/14* (2013.01); *H04W 80/04* (2013.01)

(58) Field of Classification Search
CPC ....... H04W 8/26; H04W 36/14; H04W 80/04; H04L 61/2007
See application file for complete search history.

(56) References Cited

U.S. PATENT DOCUMENTS

| 9,148,776 | B1 | 9/2015 | Schroeder |
| 11,178,725 | B2 | 11/2021 | Talebi Fard et al. |
| 11,190,989 | B2 | 11/2021 | Sirotkin et al. |
| 2014/0161055 | A1* | 6/2014 | Chitrapu ............... H04W 36/28 370/329 |

(Continued)

FOREIGN PATENT DOCUMENTS

WO    2019197016 A1    10/2019

OTHER PUBLICATIONS

Sharma, Vikash, "What is process of DORA in DHCP?", https://www.quora.com/What-is-process-of-DORA-in-DHCP, downloaded from the Internet Nov. 11, 2019, 3 pages.

(Continued)

*Primary Examiner* — Justin Y Lee
(74) *Attorney, Agent, or Firm* — Edell, Shapiro & Finnan, LLC

(57) ABSTRACT

In one example, a Network Policy Function (NPF) obtains a first identifier for a User Equipment (UE) based on communications between the UE and a first access network of a system, and an Internet Protocol (IP) address used by the UE to communicate over the first access network. The NPF obtains a second identifier for the UE based on communications between the UE and a second access network of the system. The NPF determines that the UE used the IP address to communicate over the first access network of the system based on a correlation between the first identifier for the UE and the second identifier for the UE. The NPF provides the IP address to the UE, and the UE uses the IP address to communicate over the second access network.

20 Claims, 6 Drawing Sheets

(56) References Cited

U.S. PATENT DOCUMENTS

| | | | |
|---|---|---|---|
| 2014/0204927 | A1 | 7/2014 | Horn et al. |
| 2015/0327114 | A1 | 11/2015 | Gupta et al. |
| 2016/0360464 | A1* | 12/2016 | Han .................. H04W 24/10 |
| 2017/0311197 | A1* | 10/2017 | Lopes .................. H04W 4/40 |
| 2019/0069194 | A1 | 2/2019 | Jun et al. |
| 2019/0274178 | A1 | 9/2019 | Salkintzis et al. |
| 2019/0306752 | A1 | 10/2019 | Lai |
| 2019/0373505 | A1 | 12/2019 | Jun et al. |
| 2019/0394833 | A1 | 12/2019 | Talebi Fard et al. |
| 2021/0007166 | A1 | 1/2021 | Liao et al. |
| 2021/0092664 | A1 | 3/2021 | Lai et al. |

OTHER PUBLICATIONS

3GPP, "3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725 V16.2.0, Jun. 2019, 93 pages.

3GPP, "3rd Generation Partnership Project; Technical Specification Group Services and System Aspects; Network based IP flow mobility (Release 13)", 3GPP TR 23.861 V13.0.0, Jun. 2015, 153 pages.

V. Fuller et al., "Locator/ID Separation Protocol (LISP) Map-Server Interface", Internet Engineering Task Force (IETF), Request for Comments: 6833, Category: Experimental, ISSN: 2070-1721, Jan. 2013, 13 pages.

D. Farinacci et al., "The Locator/ID Separation Protocol (LISP)", Internet Engineering Task Force (IETF), Request for Comments: 6830, Category: Experimental, ISSN: 2070-1721, Jan. 2013, 75 pages.

R. Wakikawa et al., "IPv4 Support for Proxy Mobile IPv6", Internet Engineering Task Force (IETF), Request for Comments: 5844, Category: Standards Track, ISSN: 2070-1721, May 2010, 49 pages.

S. Gundavelli, Ed. et al., "Proxy Mobile IPv6", Network Working Group, Request for Comments: 5213, Category Standards Track, Aug. 2008, 92 pages.

O'Hanlon, Piers et al., "WiFi-Based IMSI Catcher", Nov. 3, 2016, 22 pages.

O'Hanlon, Piers et al., "Mobile subscriber WiFi privacy", https://ieeexplore.ieee.org/document/8227304, May 2017, 10 pages.

S. Hanks et al., "Generic Routing Encapsulation (GRE)", Network Working Group, Oct. 1994, 8 pages.

ETSI, "5G; Non-Access-Stratum (NAS) protocol for 5G System (5GS); Stage 3 (3GPP TS 24.501 version 16.5.1 Release 16)", ETSI TS 124 501 V16.5.1, Aug. 2020, 729 pages.

3GPP, "3rd Generation Partnership Project; Technical Specification Group Core Network and Terminals; Mobile radio interface Layer 3 specification; Core network protocols; Stage 3 (Release 16)", 3GPP TS 24.008 V16.6.0, Sep. 2020, 796 pages.

3GPP, 3rd Generation Partnership Project; Technical Specification Group Services and System Aspects; System architecture for the 5G System (5GS); Stage 2 (Release 16), 3GPP TS 23.501 V16.5.1, Aug. 2020, 440 pages.

S. Gundavelli, Ed. et al., "Flow-Binding Support for Mobile IP", Internet Engineering Task Force (IETF), ISSN 2070-1721, Aug. 2015, 19 pages.

V. Fuller et al., "Locator/ID Separation Protocol (LISP) Map-Server Interface", Internet Engineering Task Force (IETF), ISSN: 2070-1721, Jan. 2013, 13 pages.

D. Farinacci et al., "The Locator/ID Separation Protocol (LISP)", Internet Engineering Task Force (IETF), ISSN 2070-1721, Jan. 2013, 75 pages.

R. Wakikawa et al., "IPv4 Support for Proxy Mobile IPv6", Internet Engineering Task Force (IETF), ISSN: 2070-1721, May 2010, 49 pages.

S. Gundavelli, Ed. et al., "Proxy Mobile IPv6", Network Working Group, Aug. 2008, 92 pages.

D. Farinacci et al., "Generic Routing Encapsulation (GRE)", Network Working Group, Mar. 2000, 9 pages.

C. Perkins et al., "IP Encapsulation within IP", Network Working Group, Oct. 1996, 14 pages.

3GPP, 3rd Generation Partnership Project; Technical Specification Group Services and System Aspects; System Architecture for the 5G System (5GS); Stage 2 (Release 16), 3GPP TS 23.501 V16.2.0, Sep. 2019, 391 pages.

3GPP, 3rd Generation Partnership Project; Technical Specification Group Core Network and Terminals; Mobile radio interface Layer 3 specification; Core network protocols; Stage 3 (Release 16), 3GPP TS 24.008 V16.2.0, Sep. 2019, 793 pages.

3GPP, 3rd Generation Partnership Project; Technical Specification Group Core Network and Terminals; Non-Access-Stratum (NAS) protocol for 5G System (5GS); Stage 3 (Release 16), 3GPP TS 24.501 V16.2.0, Sep. 2019, 611 pages.

* cited by examiner

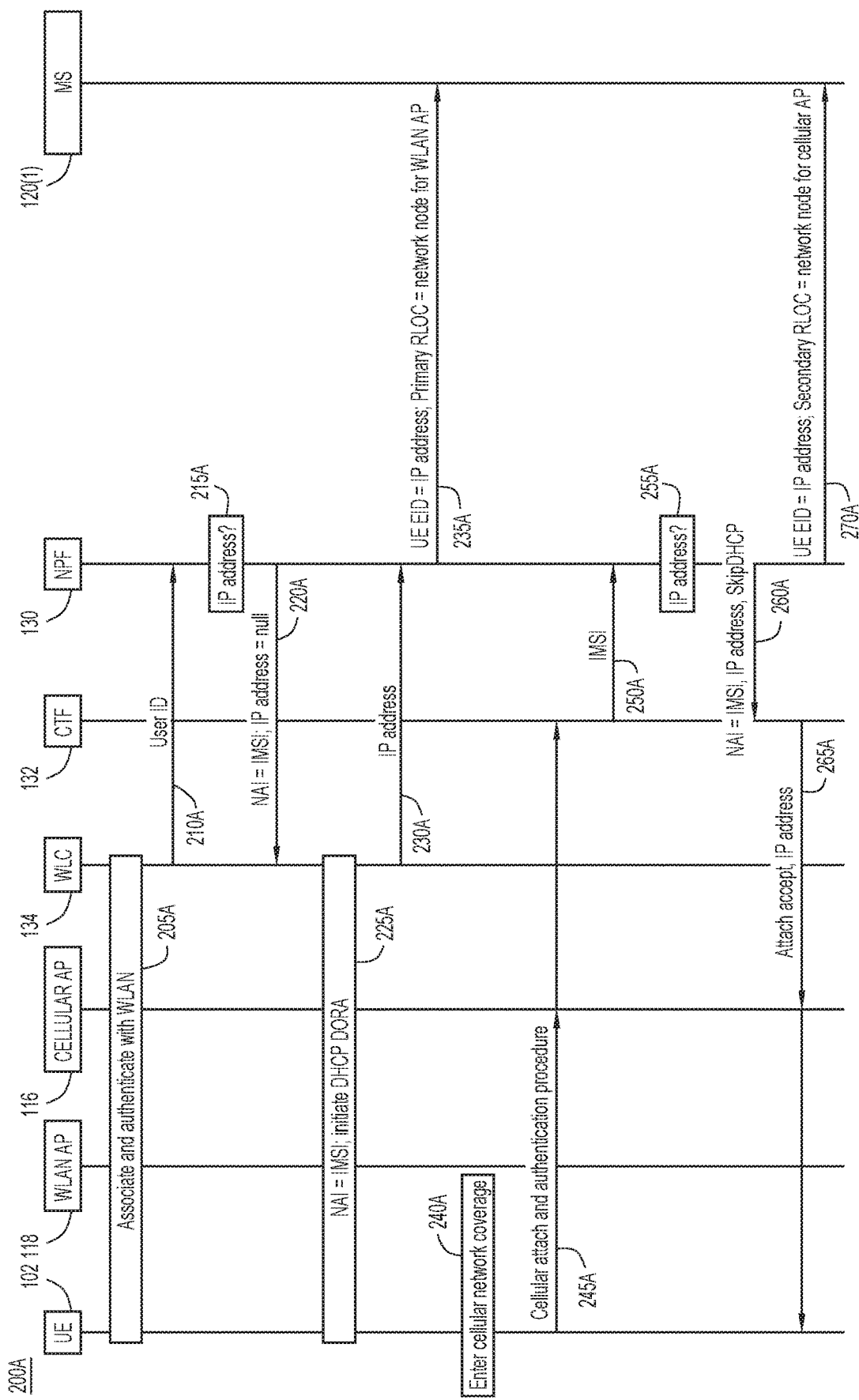

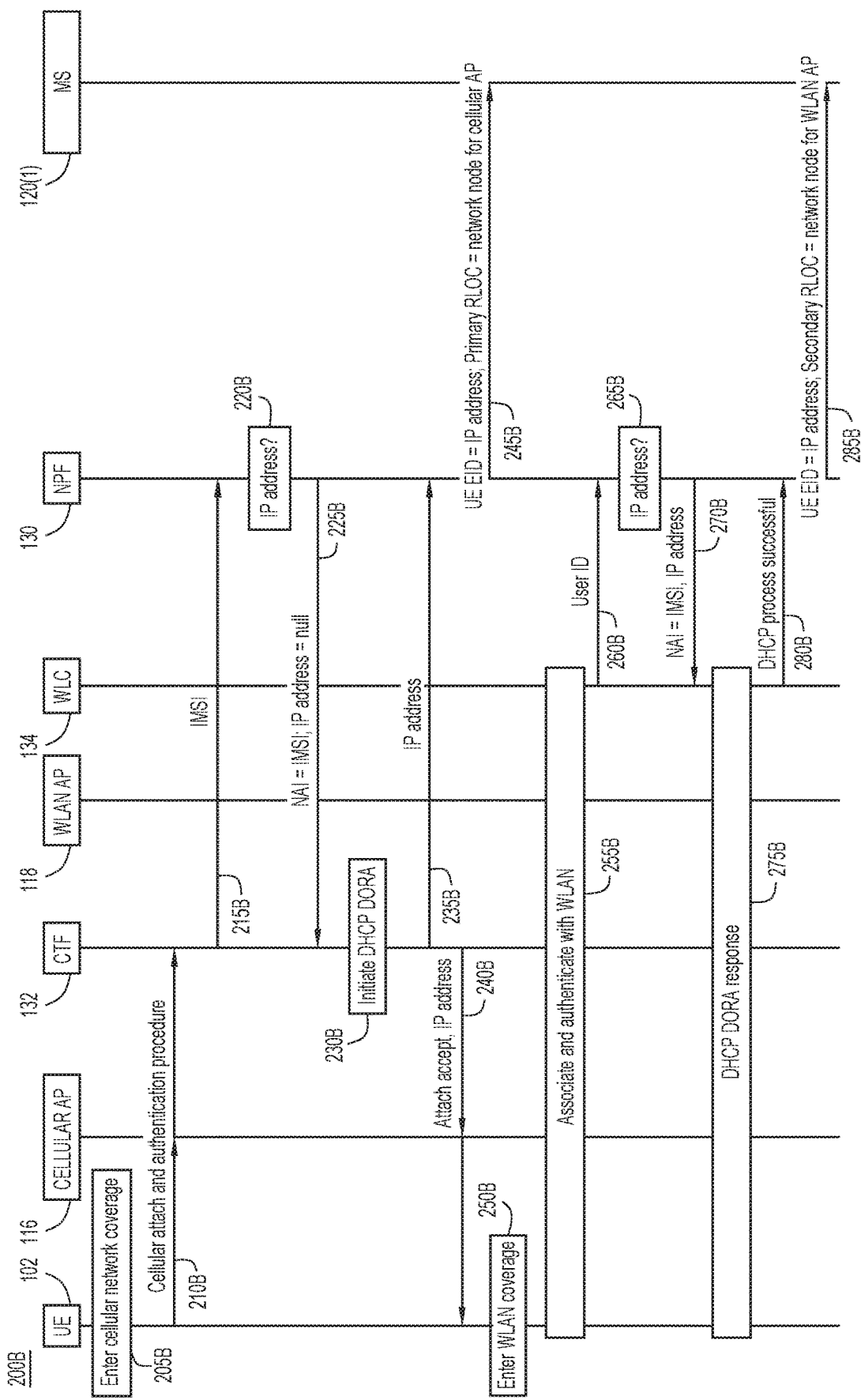

TECHNIQUES TO PROVIDE SEAMLESS MOBILITY FOR MULTIPLE ACCESSES OF AN ENTERPRISE FABRIC

TECHNICAL FIELD

The present disclosure relates to computer networking.

BACKGROUND

Many enterprises maintain private Wireless Local Area Networks (WLANs), such as private Wi-Fi® networks. There is now a growing interest in private cellular networks, such as private fourth generation (4G) Long-Term Evolution (LTE) or fifth generation (5G) New Radio (NR) networks. For example, lightly/semi-licensed bands of the Citizens Broadband Radio Service (CBRS) spectrum may support these private cellular networks. It is anticipated that newly-deployed private cellular networks for a given enterprise may co-exist with previously-deployed WLAN networks for that enterprise.

BRIEF DESCRIPTION OF THE DRAWINGS

FIG. 2A illustrates a flow diagram of a method for UE mobility from a Wireless Local Area Network (WLAN) to a cellular network, according to an example embodiment.

FIG. 2B illustrates a flow diagram of a method for UE mobility from a cellular network to a WLAN, according to an example embodiment.

DESCRIPTION OF EXAMPLE EMBODIMENTS

Overview

In one example embodiment, a Network Policy Function (NPF) obtains a first identifier for a User Equipment (UE) based on communications between the UE and a first access network of a system, and an Internet Protocol (IP) address used by the UE to communicate over the first access network. The NPF obtains a second identifier for the UE based on communications between the UE and a second access network of the system. The NPF determines that the UE used the IP address to communicate over the first access network of the system based on a correlation between the first identifier for the UE and the second identifier for the UE. The NPF provides the IP address to the UE, and the UE uses the IP address to communicate over the second access network.

Example Embodiments

Figure 1:
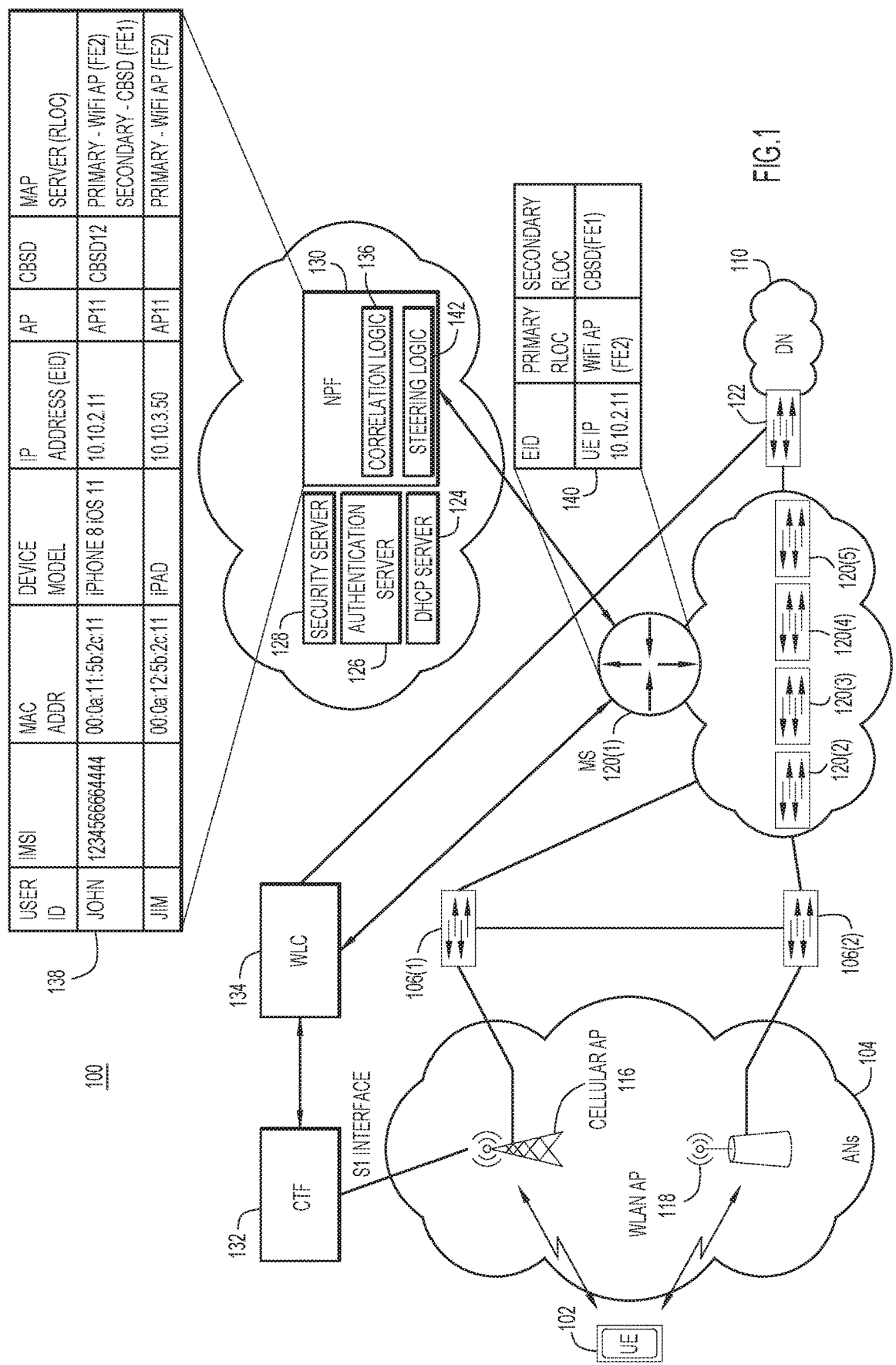
FIG. 1 illustrates a system configured for User Equipment (UE) network mobility between Access Networks (ANs), according to an example embodiment.

FIG. 1 illustrates an example system 100 configured for User Equipment (UE) network mobility. System 100 includes UE 102, Access Networks (ANs) 104, network nodes 106(1) and 106(2), and Data Network (DN) 110. ANs 104 may include cellular Access Point (AP) 116 and Wireless Local Area Network (WLAN) AP 118. System 100 may further include Map-Server (MS) 120(1) and one or more network nodes 120(2)-120(5), and DN 110 may include network node 122. System 100 may further include Dynamic Host Configuration Protocol (DHCP) server 124, authentication server 126, security server 128, and Network Policy Function (NPF) 130. System 100 may also include Cellular Termination Function (CTF) 132 and WLAN Controller (WLC) 134. System 100 may be a private network, such as a software-defined access fabric configured specifically for use by users associated with an enterprise that manages private cellular and WLAN access in system 100.

UE 102 may be associated with any suitable device configured to initiate a flow in system 100. For example, UE 102 may include a computer, a vehicle and/or any other transportation-related device having electronic devices configured thereon, an automation device, an enterprise device, an appliance, an Internet of Things (IoT) device, a Personal Digital Assistant (PDA), a laptop or electronic notebook, a cellular telephone, a smartphone, a tablet, an Internet Protocol (IP) phone, and/or any other device and/or combination of devices, components, elements, and/or objects capable of initiating voice, audio, video, media, or data exchanges within system 100. UE 102 may also include any suitable interface to a human user such as a microphone, a display, a keyboard, or other terminal equipment. UE 102 may also be any device that seeks to initiate a communication on behalf of another entity or element such as a program, a database, or any other component, device, element, or object capable of initiating an exchange within system 100. UE 102 may be configured with appropriate hardware (e.g., processor(s), memory element(s), antennas and/or antenna arrays, baseband processors (modems), and/or the like), software, logic, and/or the like to facilitate a first over-the-air (air) interface for accessing/connecting to cellular AP 116 and a second air interface for accessing/connecting to WLAN AP 118. It will be appreciated that any number of UEs may be present in system 100. In one example, the user of UE 102 is an employee of the enterprise that manages private cellular and WLAN access in system 100.

Cellular AP 116 may terminate a cellular (e.g., 4G Long-Term Evolution (LTE) or 5G New Radio (NR)) air interface and may be configured with appropriate hardware (e.g., processor(s), memory element(s), antennas and/or antenna arrays, baseband processors (modems), and/or the like), software, logic, and/or the like to provide over-the-air coverage for a private cellular access network (e.g., private 4G LTE, private 5G NR, private Citizens Broadband Radio Service (CBRS), etc.). By 'private' it is meant that a private cellular access network provides network connectivity/services to clients (e.g., UE 102) served by a network operator and/or service provider of the private cellular access network, such as an enterprise. In one example, a private cellular access network may be considered to be a network that may be implemented to serve enterprise purposes (e.g., business purposes, government purposes, educational purposes, etc.) for enterprise clients (e.g., enterprise users/devices/etc.) in which the private cellular access network may be operated by any combination of traditional mobile network operators/service providers, enterprises network operators/service providers, and/or third party network operators/service providers (e.g., neutral host network operators/service providers, cloud service providers, etc.). In various embodiments, cellular AP 116 may be implemented as any combination of an evolved Node B (eNB) to facilitate 4G LTE air accesses, a next generation Node B (gNB) to facilitate 5G NR air accesses, a next generation (nG) radio to facilitate any next generation air accesses, a CBRS Device (CBSD) to facilitate CBRS accesses, and/or the like now known or hereafter developed.

WLAN AP 118 may be configured with appropriate hardware (e.g., processor(s), memory element(s), antennas and/or antenna arrays, baseband processors (modems), and/or the like), software, logic, and/or the like to provide over-the-air coverage for a WLAN access network (e.g., Wi-Fi). In various embodiments, WLAN AP 118 may be implemented as a Wi-Fi AP and/or the like. Although illustrated as separate APs, in some embodiments cellular AP 116 and WLAN AP 118 may be a combined AP to provide any combination of cellular and WLAN accesses.

Network nodes 106(1) and 106(2) may be any suitable network nodes (e.g., switches, routers, etc.) configured to transmit network communications (e.g., packets) to/from ANs 104. In particular, network node 106(1) is configured to transmit cellular network communications to/from cellular AP 116, and network node 106(2) is configured to transmit network communications to/from WLAN AP 118.

MS 120(1) and network nodes 120(2)-120(5) may be configured to transmit network communications between each other and to/from other network entities of system 100. For example, MS 120(1) may provide/obtain control plane packets to/from NPF 130 and/or WLC 134, and network nodes 120(2)-120(5) may transmit user plane packets between network nodes 106(1) and 106(2) and DN 110.

In various embodiments, DN 110 may be any combination of the Internet, an Internet Protocol (IP) Multimedia Subsystem (IMS), Ethernet network, Ethernet switching system(s), and/or the like. DN 110 may facilitate user plane (e.g., user data/data transfer) connectivity for per-access UE 102 sessions. For example, UE 102 may access various services, applications, etc. via network node 122.

DHCP server 124 may be configured to provide DHCP services, such as initial IP address assignment, to UE 102. In one example, DHCP server 124 may be configured to send or receive DHCP Discover, Offer, Request, and Acknowledgement messages to assign an IP address to UE 102. For instance, UE 102 may broadcast a discover message to discover DHCP server 124. Upon receiving the discover message, DHCP server 124 provides an offer message that includes a proposed IP address for UE 102. UE 102 then provides a request message whereby UE 102 requests the proposed IP address. Finally, DHCP server 124 provides an acknowledgment message to indicate that the IP address has been assigned to UE 102.

Authentication server 126 may be configured for user authentication and/or subscription management. Authentication server 126 may include functionality for cellular authentication and WLAN authentication (e.g., Home Subscriber Server (HSS), Authentication, Authorization, and Accounting (AAA) server, etc.). It will be appreciated that authentication server 126 may include cellular authentication and WLAN authentication functionality distributed across one or more servers.

Security server 128 may include various services to ensure security of system 100. Security server 128 may use deep packet inspection, identity information, behavioral analysis, and/or other tools/techniques to monitor the health of system 100.

NPF 130 may include one or more servers responsible for managing network access by UE 102. In various embodiments for techniques presented herein, NPF 130 may be configured with one or more databases/repositories/etc. and/or may interface with one or more external databases/repositories/etc. in order to obtain and/or be configured with policy information for users/devices that may be present in system 100. Such internal/external databases/repositories/etc. may include any combination of enterprise databases, repositories, and/or the like for one or more users/devices (e.g., UE 102) that may be allowed to connect to accesses that may be provided via ANs 104. In various embodiments, NPF 130 may be implemented as an enterprise policy server/manager and/or the like.

In some implementations NPF 130 may maintain a converged access profile configured for a particular user/device (e.g., UE 102) as a combined profile including multiple per-access type entries for each access type to which the particular user/device can connect. In other implementations, NPF 130 may maintain a converged access profile configured for a particular user/device (e.g., UE 102) using separate per-access profiles in which each per-access profile/entry for the particular user/device can be correlated together based on the user/device access specific identities/identifiers configured for each access type. For example, NPF 130 may correlate or link multiple entries/access type profiles for a converged access profile of a user/device such that a WLAN/wired access identifier/identity for the user/device can be mapped to a cellular (e.g., private LTE) access identity/identifier for the user/device, or vice-versa. NPF 130 may utilize such linking functionality when creating/maintaining/updating session information for a user/device for multiple accesses and/or for performing other operations/functions as described herein.

CTF 132 may provide/be responsible for any combination of cellular-based access authentication services, authorization services, mobility management control, session management services with various functions being supported on a per-session basis, selection and control of user plane entities (e.g., per-session), if applicable, and/or the like. In various embodiments, CTF 132 may be implemented as any combination of a Mobility Management Entity (MME), a Serving Gateway (SGW), and/or a Packet Data Network (PDN) Gateway (PGW) in the 4G case, or as any combination of an Access and Mobility Management Function (AMF) and/or a Session Management Function (SMF) in the 5G case, and/or the like now known or hereafter developed.

WLC 134 may provide/be responsible for WLAN functions such as WLAN-based access authentication services, authorization services, intrusion prevention, Radio Frequency (RF) management, and/or the like to facilitate UE 102 connectivity via WLAN AP 118. In some implementations, WLC 134 may be configured as an evolved WLC (eWLC). CTF 132 and WLC 134 may be configured as separate entities or as combined or converged as a single multi-access termination function configured to provide operations, functions, etc. for multiple accesses that may be provided via ANs 104.

In one example, system 100 may implement Locator/ID Separation Protocol (LISP). LISP is a control plane protocol that may facilitate IP mobility for system 100. Although embodiments described herein provide example details associated with a LISP implementation, other control plane protocols may be implemented for system 100 including, but not limited to, Proxy Mobile IP version 6 (PMIPv6), Identifier Locator Addressing (ILA), etc.

A LISP implementation may utilize various constructs including Routing Locators (RLOCs) that may be associated with edge and border switches (e.g., network nodes 106(1) and 106(2)) and Endpoint Identifiers (EIDs) that may be associated with/identify clients or other endpoints (e.g., UE 102) in order to facilitate mobility for system 100. An RLOC is an IP address associated with an element in which the nomenclature 'RLOC=element' may generally represent an RLOC set to the IP address of the element. IP addresses as discussed for embodiments described herein may be implemented as IP version 4 (IPv4) and/or IPv6 addresses. Other variations for setting an RLOC may be envisioned using, for example, Type-Length-Value (TLV) expressions, or the like.

A MS is a LISP function that represents a distributed mapping database and service that accepts registration information for clients and/or other endpoint users/devices, etc. (e.g., UE 102), and stores mappings between numbering or name space constructs. For the LISP implementation of system 100, MS 120(1) may include MS functionality, and may store mappings, generally known as EID-to-RLOC mappings, between RLOCs for fabric switches/functions/ etc. (e.g., network nodes 106(1) and 106(2)) and EIDs for clients (e.g., UE 102) for which traffic is handled or otherwise associated with the switches/functions/etc. MS 120(1) may associate EIDs with any combination of IP and/or Media Access Control (MAC) addresses for a client for different EID-to-RLOC mappings that may be maintained/ managed within system 100. MS 120(1) may also communicate EID-to-RLOC mapping information to various elements of system 100 (e.g., WLC 134, NPF 130, etc.). Such information may be stored in the map-cache of the various network elements of system 100 to facilitate routing. Any network element may query MS 120(1) for the RLOC associated with a given EID. When the RLOC associated with a given EID changes, this update may be performed at MS 120(1).

Traditionally, WLANs and cellular networks have different architectures that would require UEs to perform attach/ association and authentication to both networks separately. One consequence of this is that a UE would be assigned a new IP address whenever the UE would move between a WLAN and a cellular network. For example, if the UE had an ongoing user session using a first IP address over a WLAN, moving to a cellular network would prompt assignment of a new IP address. This would disrupt the ongoing user session because, for example, the application associated with the user session would be confused by the sudden change in IP addresses. For instance, Transmission Control Protocol (TCP) connections are closed when the IP address is released from the host stack (e.g., when a Secure Shell (SSH) session closes, the corresponding Internet Protocol Security (IPSec) process and Virtual Private Network (VPN) are terminated). Thus, traditionally, movement between a WLAN and a cellular network would lead to a poor user experience, such as termination of an existing user session.

Systems that permit coexistence of private cellular networks and private WLANs associated with the same enterprise (e.g., system 100) may be configured to address this IP address assignment and preservation issue. For instance, NPF 130 may be configured with correlation logic 136, which may preserve the IP address assigned to UE 102 on one of ANs 104 and then reassign the same IP address when UE 102 accesses the other of ANs 104. Using a single IP address for all interfaces enabled through the network may improve the performance of applications accessed by UE 102 (e.g., where UE 102 accesses a common set of resources using two different ANs 104).

Correlation logic 136 may cause NPF 130 to provide UE 102 with a single IP address for multiple network interfaces. This allows UE 102 to avoid relying on a Multipath TCP (MP-TCP) stack or a Multipath Extensions for Quick User Datagram Protocol (UDP) Internet Connections (MP-QUIC) stack to load balance between the two access networks. Unlike the MP-TCP or MP-QUIC approaches, there is not necessarily a need for a proxy to handle MP-TCP-to-TCP/ MP-QUIC-to-QUIC translation in cases where the application peer is not multipath-capable.

In one example, NPF 130 uses correlation information 138 to preserve the IP address of UE 102. Correlation information 138 may comprise a converged access profile that includes information relating to UE 102 (first row). Initially, correlation information 138 may include the user ID used by UE 102 during WLAN communications, which may be a Wi-Fi/dot1xuser ID ("john"), the International Mobile Subscriber Identity (IMSI) used by UE 102 during cellular communications ("1234566664444"), the MAC address of UE 102 ("00:0a:11:5b:2c:11"), an indication of the device model of UE 102 ("iPhone 8 iOS 11"), an identification of WLAN AP 118 ("AP11"), and an identification of cellular AP 116 ("CBSD12"). Although a Wi-Fi user ID and IMSI are used in this example, any suitable stable/permanent identifier may be used. A stable identifier (e.g., enterprise username, enterprise ID, WLAN ID, etc.) may be a consistent identifier for a device within a particular system, and a permanent identifier (e.g., hardware MAC address, Serial Number (SN), etc.) may be a consistent identifier for a device across multiple systems. Furthermore, it will be appreciated that any information of correlation information 138 may be known a priori or gathered dynamically. It will also be appreciated that NPF 130 may store correlation information for any suitable number of UEs. For example, correlation information 138 may also include information relating to another UE (second row). This UE is only Wi-Fi capable, and cannot communicate over cellular networks.

In this example, UE 102 initially attaches to Wi-Fi via WLAN AP 118. NPF 130 obtains Wi-Fi user ID "john" based on communications between UE 102 and the WLAN. For example, UE 102 may provide an indication of the Wi-Fi user ID as part of its initial Wi-Fi communications, and that indication may be forwarded to NPF 130. Based on the Wi-Fi user ID, NPF 130 determines that UE 102 has not previously used an IP address to communicate over the WLAN or the cellular network. For example, NPF 130 may search correlation information 138 for an IP address corresponding to Wi-Fi user ID "john" and determine that there is no such IP address. In response, NPF 130 may provide an indication (e.g., to WLC 134) that there is no such IP address and that therefore UE 102 should undergo a new IP address assignment procedure (e.g., using DHCP). It will be appreciated that any suitable WLAN identifier may be used to identify UE 102 (e.g., Wi-Fi user ID, etc.).

DHCP server 124 may assign a new IP address (e.g., "10.10.2.11") to UE 102. Once the new IP address has been assigned, UE 102 uses the IP address to communicate over the WLAN, and NPF 130 may obtain the IP address. In response to obtaining the IP address, NPF 130 may insert "10.10.2.11" in correlation information 138 as the IP address of UE 102. NPF 130 may also insert an indication that network node 106(2), which corresponds to WLAN AP 118, is the primary network node (rightmost column). Here, network node 106(2) is identified by "FE2."

NPF 130 may further cause network traffic that identifies a destination of the network traffic with the IP address to be provided to network node 106(1). That is, NPF 130 may dynamically provide an update to MS 120(1) indicating the IP address of UE 102. The update may also indicate that network node 106(2) is the primary network node. MS 120(1) may store this update as EID-to-RLOC mapping information 140, where the IP address of UE 102 is the EID and network node 106(2) is the primary RLOC. Based on EID-to-RLOC mapping information 140, MS 120(1) may direct (or cause to be directed) incoming network traffic (e.g., from DN 110) having a destination address of "10.10.2.11" to network node 106(2). It will be appreciated that other network entities, such as WLC 134, may also/alternatively provide the update to MS 120(1).

Subsequently, UE 102 may move to cellular AP 116. For example, the user of UE 102 may have carried UE 102 to a new location of the enterprise. For instance, buildings of an enterprise may be in private WLAN coverage and a parking lot near the buildings may be in private cellular coverage. When the user exits a building and walks through the parking lot (e.g., toward another building), this may prompt UE 102 to attach to cellular AP 116 instead of WLAN AP 118. NPF 130 thereby obtains IMSI "1234566664444" based on communications between UE 102 and the cellular network. For example, UE 102 may provide an indication of the IMSI as part of its initial cellular communications, and that indication may be forwarded to NPF 130. It will be appreciated that any suitable cellular identifier may be used to identify UE 102 (e.g., IMSI, International Mobile Equipment Identity (IMEI), etc.).

NPF 130 may determine that UE 102 used the IP address to communicate over the WLAN based on correlation information 138, and in particular based on a correlation between Wi-Fi user ID "john" and IMSI "1234566664444." For example, NPF 130 may obtain the indication of the IMSI and determine whether there is a corresponding IP address stored in correlation information 138. In this example, NPF 130 previously stored IP address "10.10.2.11" based on the WLAN communications. Upon identifying IP address "10.10.2.11," NPF 130 provides (directly or indirectly) IP address "10.10.2.11" to UE 102, thereby allowing UE 102 to use the same IP address to communicate over the cellular network as the WLAN. In one example, NPF 130 may also provide an indication to skip a new IP address assignment procedure (e.g., DHCP) for UE 102. That is, because IP address "10.10.2.11" has already been assigned, UE 102 may skip DHCP to reduce the amount of signaling in system 100.

In response to obtaining the IP address, NPF 130 may insert an indication in correlation information 138 that network node 106(2), which corresponds to WLAN AP 118, is the primary network node, and network node 106(1), which corresponds to cellular AP 116, is the secondary network node (rightmost column). Here, network node 106(1) is identified by "FE1" and network node 106(2) is identified by "FE2." NPF 130 may dynamically provide an update to MS 120(1) indicating that network node 106(1) is the secondary network node. MS 120(1) may store this update as EID-to-RLOC mapping information 140. NPF 130 may further cause network traffic that identifies a destination of the network traffic with the IP address to be provided to network node 106(1). That is, based on EID-to-RLOC mapping information 140, MS 120(1) may direct (or cause to be directed) incoming network traffic having a destination address of "10.10.2.11" to network node 106(1). NPF 130 may continue to enforce IP address preservation in response to subsequent movement of UE 102 between cellular AP 116 and WLAN AP 118 (e.g., if UE 102 subsequently moves back to WLAN AP 118).

NPF 130 also includes steering logic 142, which may proactively prompt UE 102 to move between cellular AP 116 and WLAN AP 118 based on network conditions when there is overlapping coverage (e.g., where UE 102 is within coverage of both the cellular network and the WLAN). For example, if UE 102 is connected to the cellular network, NPF 130 may obtain network measurements of the WLAN and the cellular network that are indicative of whether the WLAN would outperform the cellular network in providing network services to UE 102. Based on the network measurements, NPF 130 may determine that the WLAN would outperform the cellular network, and in response cause UE 102 to communicate over the WLAN using the IP address "10.10.2.11." This may include moving UE 102 from cellular AP 116 to WLAN AP 118. Similarly, if UE 102 is connected to the WLAN, NPF 130 may cause UE 102 to communicate over the cellular network using the IP address "10.10.2.11" in response to determining that network measurements of the WLAN and the cellular network indicate that the cellular network would outperform the WLAN in providing network services to UE 102. Steering logic 142 may thus provide greater control for NPF 130 to signal to UE 102 to select a particular AN 104 based on the location, coverage, load, predictive pattern, etc., for AN-agnostic applications.

In one example, Ultra-Reliable Low-Latency Communication (URLLC) may be employed in system 100 by duplicating packets to ensure that at least one of the duplicate packets successfully arrives at its intended destination. For incoming (downlink) traffic, MS 120(1) may command network nodes 120(2)-120(5) to provide duplicate packets from DN 110 to network node(s) 106(1) and/or 106(2). For outgoing (uplink) traffic, MS 120(1) may similarly command network nodes 120(2)-120(5) to provide duplicate packets from network node(s) 106(1) and/or 106(2) to DN 110. Additionally/alternatively, UE 102 may provide duplicate packets across ANs 104 (e.g., one duplicate packet to cellular AP 116 and one duplicate packet to WLAN AP 118) to ensure that at least one of the duplicate packets reaches DN 110.

With continuing reference to FIG. 1, FIG. 2A illustrates a flow diagram of an example method 200A for UE 102 mobility from the WLAN to the cellular network (e.g., when a user walks from a building in private WLAN coverage to a parking lot in private cellular coverage), and FIG. 2B illustrates a flow diagram of an example method 200B for UE 102 mobility from the cellular network to the WLAN (e.g., when a user walks from a parking lot in private cellular coverage to a building in private WLAN coverage). Turning first to FIG. 2A, at 205A, UE 102 associates and authenticates with the WLAN. At 210A, NPF 130 obtains, from WLC 134, an indication of the user ID associated with UE 102 (here, "john"). At 215A, NPF 130 determines whether an IP address already exists in correlation information 138 that corresponds to UE 102. In this case, there is no such preexisting IP address. At 220A, NPF 130 provides, to WLC 134, an indication of the Network Access Identifier (NAI) of UE 102 (here, IMSI "1234566664444") and an indication that the IP address field in correlation information 138 is null.

At 225A, WLC 134 provides, to UE 102, an indication of the NAI of UE 102 and an indication to initiate a new IP address assignment procedure (e.g., using DHCP) to obtain a new IP address for WLAN communications. In one example, the IMSI may be provided to DHCP server 124. DHCP server generates the IP address, and at 230A, NPF 130 obtains, from WLC 134, an indication of the IP address assigned to UE 102 by DHCP server 124 (here, "10.10.2.11"). At 235A, NPF 130 provides an indication to MS 120(1) to set the UE EID to the assigned IP address and the primary RLOC to network node 106(2). This may cause incoming network traffic with a destination address set to the IP address to be provided to WLAN AP 118.

At 240A, UE 102 enters coverage of the cellular network and, at 245A, initiates a cellular attach and authentication procedure. At 250A, NPF 130 obtains, from CTF 132, an indication of the IMSI associated with UE 102 (here, "1234566664444"). At 255A, NPF 130 determines whether an IP address already exists in correlation information 138 that corresponds to UE 102. In this case, NPF 130 determines that UE 102 used the IP address "10.10.2.11" to communicate over the WLAN based on correlation information 138, which includes a correlation between the user ID and the IMSI. At 260A, NPF 130 provides an indication of the IP address to CTF 132 with an indication of the IMSI and an indication to skip a new IP address assignment procedure for UE 102. At 265A, UE 102 obtains, from CTF 132, an attach accept message and an indication of the IP address. UE 102 may use the IP address to communicate over the cellular network. At 270A, NPF 130 provides an indication to MS 120(1) to set the secondary RLOC corresponding to the assigned IP address to network node 106(1). This may cause incoming network traffic with a destination address set to the IP address to be provided to cellular AP 116. Thus, the IP address is preserved across the WLAN and cellular interfaces.

Turning now to FIG. 2B, at 205B, UE 102 enters coverage of the cellular network and, at 210B, initiates a cellular attach and authentication procedure. At 215B, NPF 130 obtains, from CTF 132, an indication of the IMSI associated with UE 102 (here, "1234566664444"). At 220B, NPF 130 determines whether an IP address already exists in correlation information 138 that corresponds to UE 102. In this case, there is no such preexisting IP address. At 225B, NPF 130 provides, to CTF 132, an indication of the NAI of UE 102 (here, IMSI "1234566664444") and an indication that the IP address field in correlation information 138 is null. At 230B, CTF 132 initiates DHCP DORA communications to obtain a new IP address for WLAN communications. In one example, the IMSI may be provided to DHCP server 124. At 235B, NPF 130 obtains, from WLC 134, an indication of the IP address assigned to UE 102 by DHCP server 124 (here, "10.10.2.11"). At 240B, UE 102 obtains, from CTF 132, an attach accept message and an indication of the IP address. At 245B, NPF 130 provides an indication to MS 120(1) to set the UE EID to the assigned IP address and the primary RLOC to network node 106(1). This may cause incoming network traffic with a destination address set to the IP address to be provided to cellular AP 116.

At 250B, UE 102 enters coverage of the WLAN and, at 255B, associates and authenticates with the WLAN. At 260B, NPF 130 obtains, from WLC 134, an indication of the user ID associated with UE 102 (here, "john"). At 265B, NPF 130 determines whether an IP address already exists in correlation information 138 that corresponds to UE 102. In this case, NPF 130 determines that UE 102 used the IP address to communicate over the WLAN based on correlation information 138, which includes a correlation between the user ID and the IMSI. At 270B, NPF 130 provides, to WLC 134, an indication of the IP address to CTF 132 with an indication of the IMSI. At 275B, WLC 134 acts as a proxy for DHCP server 124 and provides a DHCP DORA response to UE 102. Thus, DHCP signaling to DHCP server 124 is skipped. At 280B, WLC 134 provides, to NPF 130, an indication that the DHCP process was successful. At 285B, NPF 130 provides an indication to MS 120(1) to set the secondary RLOC corresponding to the assigned IP address to network node 106(2). This may cause incoming network traffic with a destination address set to the IP address to be provided to WLAN AP 118. Thus, the IP address is preserved across the WLAN and cellular interfaces.

Figure 3:
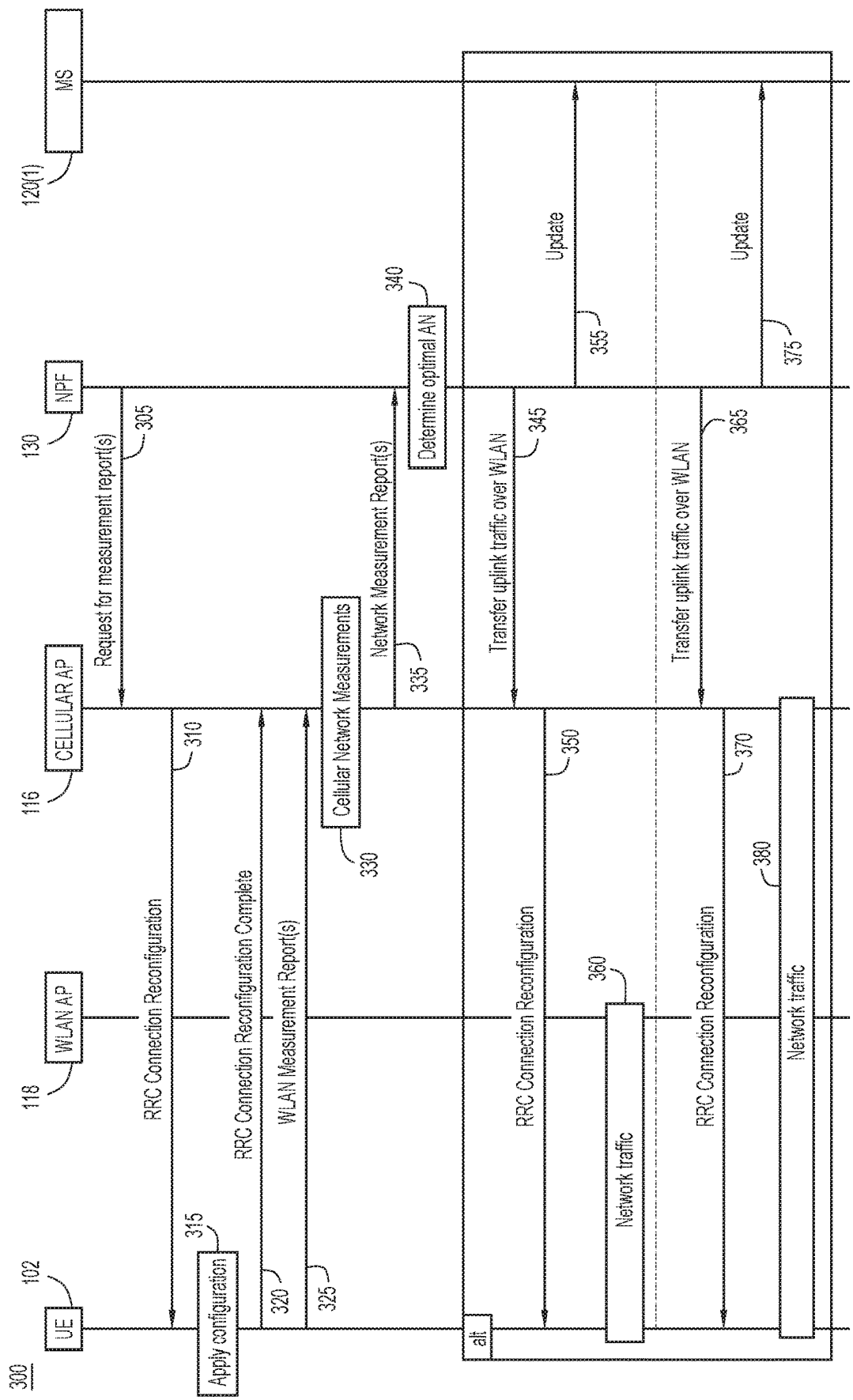
FIG. 3 illustrates a flow diagram of a method for UE network mobility between multiple ANs based on network measurements, according to an example embodiment.

FIG. 3 illustrates a flow diagram of an example method 300 for UE 102 network mobility based on network measurements. Method 300 may occur after method 200A or method 200B (e.g., after UE 102 has associated with cellular AP 116 and WLAN AP 118). At 305, NPF 130 provides, to cellular AP 116, a request for WLAN and cellular network measurement reports for UE 102. The request may specify the Service Set Identifier (SSID) and/or Basic SSID (BSSID) for which WLAN measurements are to be taken. At 310, cellular AP 116 provides a Radio Resource Control (RRC) connection reconfiguration message to UE 102. The RRC connection reconfiguration message may indicate the relevant SSID and/or BSSID. The RRC connection reconfiguration message may also specify an interval for which the measurements should be taken and/or a threshold that measurements above or below which may trigger sending of a measurement report (e.g., UE 102 may provide WLAN measurements for WLAN AP 118 to cellular AP 116 at the predefined interval/threshold). At 315, UE 102 applies the WLAN measurement and reporting configuration, and, at 320, provides an indication to cellular AP 116 that the RRC connection reconfiguration is complete.

At 325, UE 102 provides one or more measurement reports to cellular AP 116. The one or more measurement reports may include WLAN measurements such as Received Signal Strength Indicator (RSSI), Signal-to-Noise Ratio (SNR), data rate, packet retries, etc. At 330, cellular AP 116 may perform cellular measurements for UE 102 such as Reference Signal Receive Power (RSRP), RSSI, Channel Quality Indicator (CQI), etc. The WLAN and cellular measurements may include any suitable RF or other measurements. In certain examples, the one or more measurement reports obtained as part of operation 315 may include both WLAN and cellular network measurements, and/or the cellular AP 116 may obtain the cellular network measurements before the WLAN measurements. In another example, cellular AP 116 may perform the cellular network measurements continuously for UE 102, and obtain WLAN measurement reports periodically.

At 335, NPF 130 obtains the WLAN and cellular network measurements from cellular AP 116. At 340, NPF 130 determines that the AN over which UE 102 is not currently communicating would outperform the AN over which UE 102 is currently communicating in providing the network services to UE 102. In one example, NPF 130 may determine the best link for UE 102 using any suitable network traffic steering technique(s). If UE 102 is currently communicating over the cellular network, NPF 130 determines that the WLAN would outperform the cellular network. Conversely, if UE 102 is currently communicating over the WLAN, NPF 130 determines that the cellular network would outperform the WLAN. Operations 345-360 address the former situation, and alternative operations 365-380 address the latter.

If UE 102 is currently communicating over the cellular network, then at 345, NPF 130 causes UE 102 to communicate over the WLAN network by providing a trigger to cellular AP 116 to transfer uplink traffic over the WLAN. At 350, cellular AP 116 provides an RRC connection reconfiguration message to UE 102 that includes a command to steer uplink traffic to the WLAN. Thus, UE 102 is assigned the uplink traffic path using RRC messaging. UE 102 may continue using the same IP address "10.10.2.11." At 355, NPF 130 provides, to MS 120(1), an update regarding RLOC assignment for downlink traffic. For example, the update may indicate that network traffic with a destination address set to the IP address is to be provided to WLAN AP 118. At 360, uplink and downlink network data traffic is exchanged between UE 102 and WLAN AP 118 (e.g., over a Wi-Fi link).

If UE 102 is currently communicating over the WLAN, then at 365, NPF 130 causes UE 102 to communicate over the cellular network by providing a trigger to cellular AP 116 to transfer uplink traffic over the cellular network. At 370, cellular AP 116 provides an RRC connection reconfiguration message to UE 102 that includes a command to steer uplink traffic to the cellular network. Thus, UE 102 is assigned the uplink traffic path using RRC messaging. UE 102 may continue using the same IP address "10.10.2.11." At 375, NPF 130 provides, to MS 120(1), an update regarding RLOC assignment for downlink traffic. For example, the update may indicate that network traffic with a destination address set to the IP address is to be provided to cellular AP 116. At 380, uplink and downlink network data traffic is exchanged between UE 102 and cellular AP 116 (e.g., over a private 4G LTE or 5G NR link).

Figure 4:
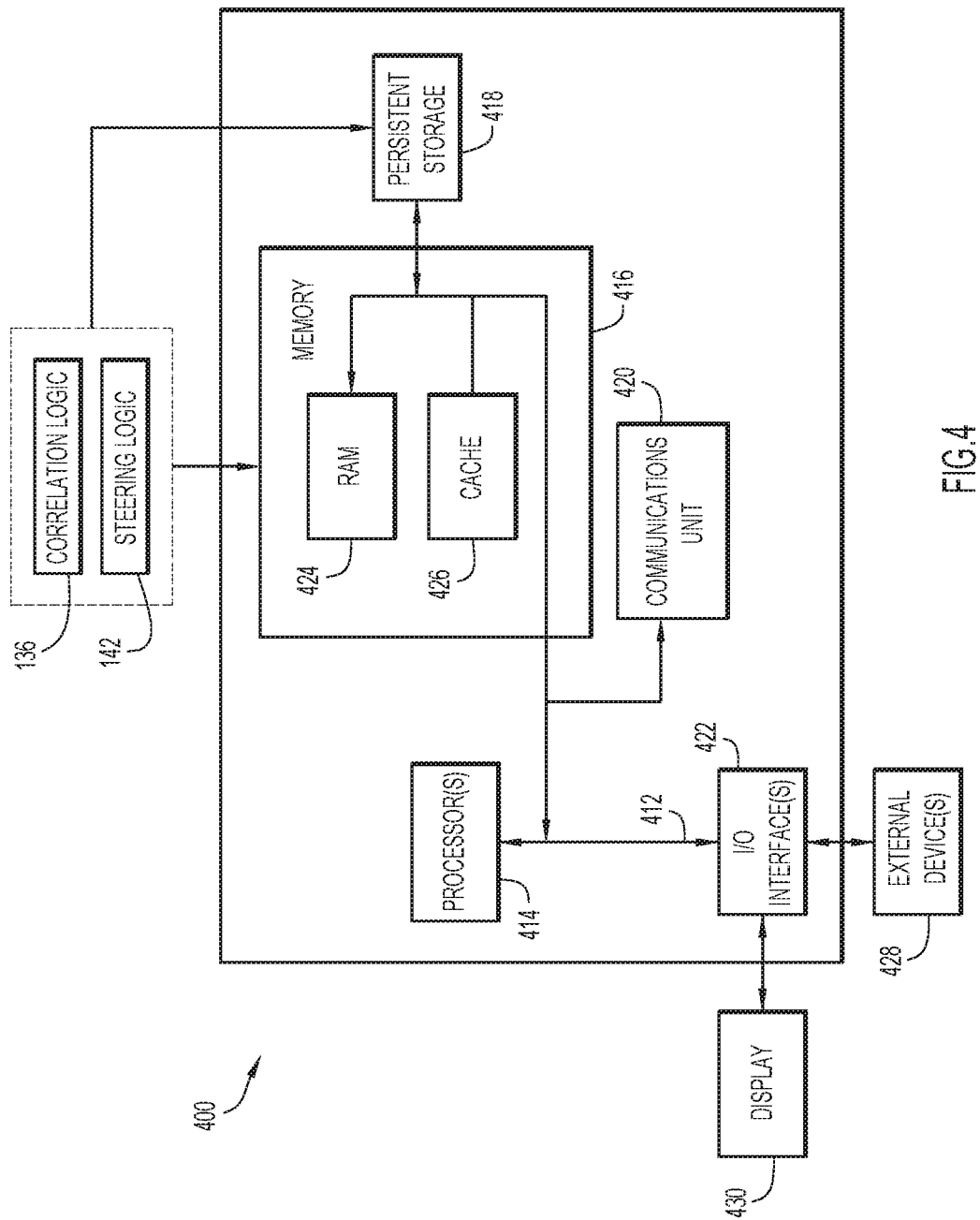
FIG. 4 illustrates a block diagram of a computing device configured for UE network mobility between ANs, according to an example embodiment.

FIG. 4 illustrates a hardware block diagram of an example device 400 (e.g., computing device, such as a server hosting NPF 130). It should be appreciated that FIG. 4 provides only an illustration of one embodiment and does not imply any limitations with regard to the environments in which different embodiments may be implemented. Many modifications to the depicted environment may be made.

As depicted, the device 400 includes a bus 412, which provides communications between computer processor(s) 414, memory 416, persistent storage 418, communications unit 420, and Input/Output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes Random Access Memory (RAM) 424 and cache memory 426. In general, memory 416 can include any suitable volatile or non-volatile computer readable storage media. Instructions for correlation logic 136 and steering logic 142 may be stored in memory 416 or persistent storage 418 for execution by computer processor(s) 414.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to device 400. For example, I/O interface(s) 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

Figure 5:
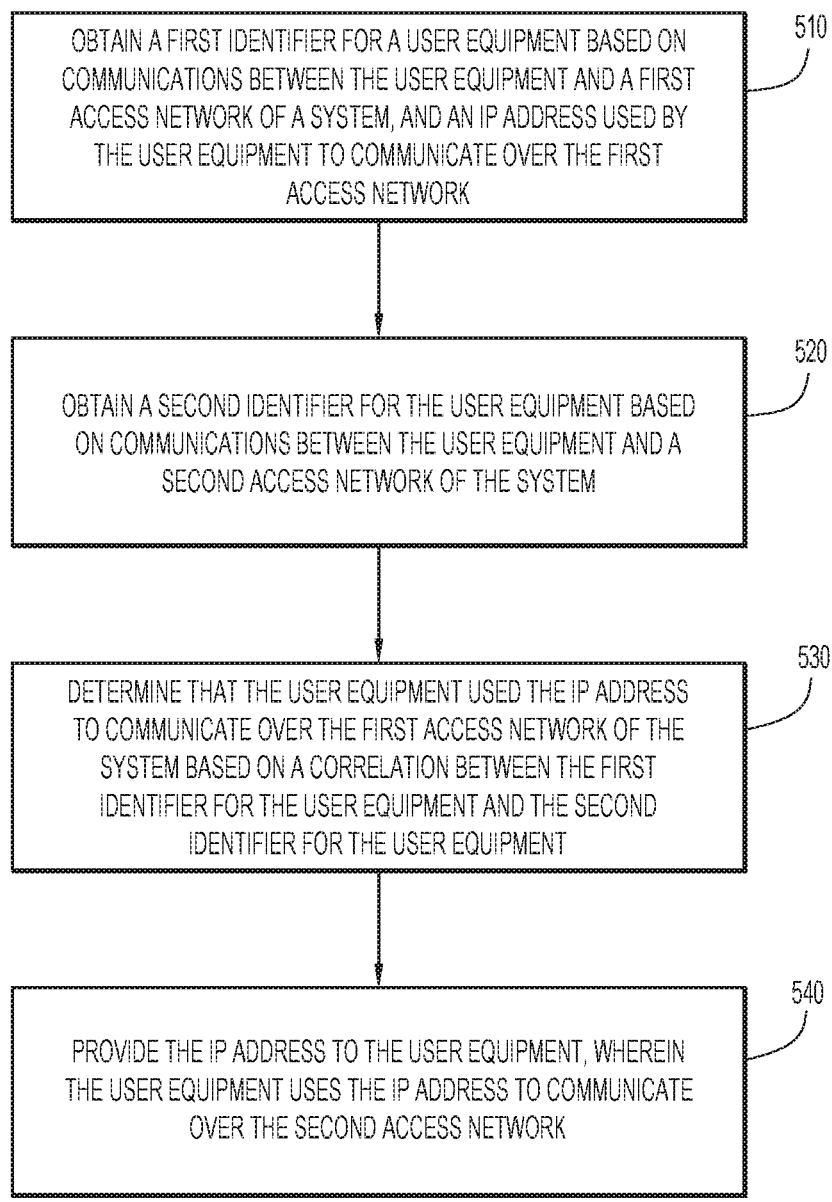
FIG. 5 illustrates a flowchart of a method for UE network mobility between ANs, according to an example embodiment.

FIG. 5 is a flowchart of an example method 500 for UE network mobility. In this example, NPF 130 performs method 500. At 510, NPF 130 obtains a first identifier for a user equipment based on communications between the UE and a first access network of a system, and an IP address used by the UE to communicate over the first access network. At 520, NPF 130 obtains a second identifier for the UE based on communications between the UE and a second access network of the system. At 530, NPF 130 determines that the UE used the IP address to communicate over the first access network of the system based on a correlation between the first identifier for the UE and the second identifier for the UE. At 540, NPF 130 provides the IP address to the UE, wherein the UE uses the IP address to communicate over the second access network.

Techniques described herein may proceed in two stages. The first stage may involve IP address assignment and preservation across heterogeneous ANs. The second stage may involve WLAN and private cellular network measurement collection using a cellular AP and on-demand traffic steering using RRC signaling and private cellular link in a Software Defined Access (SDA) fabric. The NPF responsible for performing operations described herein may provide a correlation of WLAN and private cellular client identities for IP address preservation and provide a trigger for WLAN and private cellular RF measurements while initiating updates to a MS (e.g., RLOC) and a UE (e.g., RRC signaling) for network traffic switching between ANs.

As described herein, the NPF may provide a correlation between cellular network and WLAN user identities to ensure assignment of a single IP address on multiple ANs. The NPF may also update a MS in a SDA fabric regarding the mapping of the EID to the primary and secondary RLOCs. The NPF may obtain WLAN and cellular network measurement reports periodically or based on a threshold through a single access node (e.g., a cellular AP). The NPF may dynamically update the MS with a primary RLOC for the user identified by EID for downlink traffic based on the measurement reports. The NPF may further trigger an RRC steering command through the cellular AP to the UE to steer network traffic between the private cellular network and WLAN while being connected on both the links using the control plane.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining a first identifier for a user equipment based on communications between the user equipment and a first access network of a system, and an IP address used by the user equipment to communicate over the first access network; obtaining a second identifier for the user equipment based on communications between the user equipment and a second access network of the system; determining that the user equipment used the IP address to communicate over the first access network of the system based on a correlation between the first identifier for the user equipment and the second identifier for the user equipment; and providing the IP address to the user equipment, wherein the user equipment uses the IP address to communicate over the second access network.

In one example, the method further comprises: in response to determining that the user equipment used the IP address to communicate over the first access network of the system, providing an indication to skip a new IP address assignment procedure for the user equipment.

In one example, the method further comprises: in response to obtaining the first identifier for the user equipment, providing an indication to perform a new IP address assignment procedure for the user equipment using the first identifier.

In one example, the method further comprises: in response to obtaining the IP address, causing network traffic that identifies a destination of the network traffic with the IP address to be provided to a network node in communication with an access point for the first access network.

In one example, the method further comprises: in response to determining that the user equipment used the IP address to communicate over the first access network of the system, causing network traffic that identifies a destination of the network traffic with the IP address to be provided to a network node in communication with an access point for the second access network.

In one example, the method further comprises: obtaining network measurements of the first access network and the second access network that are indicative of whether the first access network would outperform the second access network in providing network services to the user equipment. In a further example, the method further comprises: based on the network measurements, determining that the first access network would outperform the second access network in providing the network services to the user equipment; and in response to determining that the first access network would outperform the second access network in providing the network services to the user equipment, causing the user equipment to communicate over the first access network using the IP address.

In one example, the first access network is a first one of a wireless local area network and a cellular network, and the second access network is a second one of the wireless local area network and the cellular network.

In another form, an apparatus is provided. The apparatus comprises: a network interface configured to obtain or provide network communications; and one or more processors coupled to the network interface, wherein the one or more processors are configured to: obtain a first identifier for a user equipment based on communications between the user equipment and a first access network of a system, and an IP address used by the user equipment to communicate over the first access network; obtain a second identifier for the user equipment based on communications between the user equipment and a second access network of the system; determine that the user equipment used the IP address to communicate over the first access network of the system based on a correlation between the first identifier for the user equipment and the second identifier for the user equipment; and provide the IP address to the user equipment, wherein the user equipment uses the IP address to communicate over the second access network.

In another form, one or more non-transitory computer readable storage media are provided. The non-transitory computer readable storage media are encoded with instructions that, when executed by a processor, cause the processor to: obtain a first identifier for a user equipment based on communications between the user equipment and a first access network of a system, and an IP address used by the user equipment to communicate over the first access network; obtain a second identifier for the user equipment based on communications between the user equipment and a second access network of the system; determine that the user equipment used the IP address to communicate over the first access network of the system based on a correlation between the first identifier for the user equipment and the second identifier for the user equipment; and provide the IP address to the user equipment, wherein the user equipment uses the IP address to communicate over the second access network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining a first identifier for a user equipment based on communications between the user equipment and a first access network of a system, and an Internet Protocol (IP) address used by the user equipment to communicate over the first access network, wherein the first access network is one of a wireless local area network and a cellular network, and wherein the first identifier is one of a wireless local area network identifier and a cellular identifier;
   obtaining a second identifier for the user equipment based on communications between the user equipment and a second access network of the system, wherein the second access network is another one of the wireless local area network and the cellular network that is different from the first access network, and wherein the second identifier is another one of the wireless local area network identifier and the cellular identifier that is different from the first identifier;
   determining that the user equipment used the IP address to communicate over the first access network of the system based on a correlation between the first identifier for the user equipment and the second identifier for the user equipment; and
   providing the IP address to the user equipment, wherein the user equipment uses the IP address to communicate over the second access network.

2. The method of claim 1, further comprising:
   in response to determining that the user equipment used the IP address to communicate over the first access network of the system, providing an indication to skip a new IP address assignment procedure for the user equipment.

3. The method of claim 1, further comprising:
   in response to obtaining the first identifier for the user equipment, providing an indication to perform a new IP address assignment procedure for the user equipment using the first identifier.

4. The method of claim 1, further comprising:
   in response to obtaining the IP address, causing network traffic that identifies a destination of the network traffic with the IP address to be provided to a network node in communication with an access point for the first access network.

5. The method of claim 1, further comprising:
   in response to determining that the user equipment used the IP address to communicate over the first access network of the system, causing network traffic that identifies a destination of the network traffic with the IP address to be provided to a network node in communication with an access point for the second access network.

6. The method of claim 1, further comprising:
   obtaining network measurements of the first access network and the second access network that are indicative of whether the first access network would outperform the second access network in providing network services to the user equipment.

7. The method of claim 6, further comprising:
based on the network measurements, determining that the first access network would outperform the second access network in providing the network services to the user equipment; and
in response to determining that the first access network would outperform the second access network in providing the network services to the user equipment, causing the user equipment to communicate over the first access network using the IP address.

8. An apparatus comprising:
a network interface configured to obtain or provide network communications; and
one or more processors coupled to the network interface, wherein the one or more processors are configured to:
obtain a first identifier for a user equipment based on communications between the user equipment and a first access network of a system, and an Internet Protocol (IP) address used by the user equipment to communicate over the first access network, wherein the first access network is one of a wireless local area network and a cellular network, and wherein the first identifier is one of a wireless local area network identifier and a cellular identifier;
obtain a second identifier for the user equipment based on communications between the user equipment and a second access network of the system, wherein the second access network is another one of the wireless local area network and the cellular network that is different from the first access network, and wherein the second identifier is another one of the wireless local area network identifier and the cellular identifier that is different from the first identifier;
determine that the user equipment used the IP address to communicate over the first access network of the system based on a correlation between the first identifier for the user equipment and the second identifier for the user equipment; and
provide the IP address to the user equipment, wherein the user equipment uses the IP address to communicate over the second access network.

9. The apparatus of claim 8, wherein the one or more processors are further configured to:
in response to determining that the user equipment used the IP address to communicate over the first access network of the system, provide an indication to skip a new IP address assignment procedure for the user equipment.

10. The apparatus of claim 8, wherein the one or more processors are further configured to:
in response to obtaining the first identifier for the user equipment, provide an indication to perform a new IP address assignment procedure for the user equipment using the first identifier.

11. The apparatus of claim 8, wherein the one or more processors are further configured to:
in response to obtaining the IP address, cause network traffic that identifies a destination of the network traffic with the IP address to be provided to a network node in communication with an access point for the first access network.

12. The apparatus of claim 8, wherein the one or more processors are further configured to:
in response to determining that the user equipment used the IP address to communicate over the first access network of the system, cause network traffic that identifies a destination of the network traffic with the IP address to be provided to a network node in communication with an access point for the second access network.

13. The apparatus of claim 8, wherein the one or more processors are further configured to:
obtain network measurements of the first access network and the second access network that are indicative of whether the first access network would outperform the second access network in providing network services to the user equipment.

14. The apparatus of claim 13, wherein the one or more processors are further configured to:
based on the network measurements, determine that the first access network would outperform the second access network in providing the network services to the user equipment; and
in response to determining that the first access network would outperform the second access network in providing the network services to the user equipment, cause the user equipment to communicate over the first access network using the IP address.

15. One or more non-transitory computer readable storage media encoded with instructions that, when executed by a processor, cause the processor to:
obtain a first identifier for a user equipment based on communications between the user equipment and a first access network of a system, and an Internet Protocol (IP) address used by the user equipment to communicate over the first access network, wherein the first access network is one of a wireless local area network and a cellular network, and wherein the first identifier is one of a wireless local area network identifier and a cellular identifier;
obtain a second identifier for the user equipment based on communications between the user equipment and a second access network of the system, wherein the second access network is another one of the wireless local area network and the cellular network that is different from the first access network, and wherein the second identifier is another one of the wireless local area network identifier and the cellular identifier that is different from the first identifier;
determine that the user equipment used the IP address to communicate over the first access network of the system based on a correlation between the first identifier for the user equipment and the second identifier for the user equipment; and
provide the IP address to the user equipment, wherein the user equipment uses the IP address to communicate over the second access network.

16. The one or more non-transitory computer readable storage media of claim 15, wherein the instructions further cause the processor to:
in response to determining that the user equipment used the IP address to communicate over the first access network of the system, provide an indication to skip a new IP address assignment procedure for the user equipment.

17. The one or more non-transitory computer readable storage media of claim 15, wherein the instructions further cause the processor to:
in response to obtaining the first identifier for the user equipment, provide an indication to perform a new IP address assignment procedure for the user equipment using the first identifier.

18. The one or more non-transitory computer readable storage media of claim 15, wherein the instructions further cause the processor to:
- in response to obtaining the IP address, cause network traffic that identifies a destination of the network traffic with the IP address to be provided to a network node in communication with an access point for the first access network.

19. The one or more non-transitory computer readable storage media of claim 15, wherein the instructions further cause the processor to:
- in response to determining that the user equipment used the IP address to communicate over the first access network of the system, cause network traffic that identifies a destination of the network traffic with the IP address to be provided to a network node in communication with an access point for the second access network.

20. The one or more non-transitory computer readable storage media of claim 15, wherein the instructions further cause the processor to:
- obtain network measurements of the first access network and the second access network that are indicative of whether the first access network would outperform the second access network in providing network services to the user equipment.

* * * * *